United States Patent [19]

Miyashita et al.

[11] 3,909,446

[45] Sept. 30, 1975

[54] METHOD OF MANUFACTURING HIGH QUALITY REDUCING GAS BY TWO STAGE REFORMING PROCESSES

[75] Inventors: Isuneo Miyashita, Kawasaki; Shoichiro Ozeki, Yokohama; Hiroaki Nishio, Kawasaki; Tosio Nayuki, Kawasaki; Tadashi Kobayashi, Kawasaki; Gyoichi Suzuki, Tokyo; Tadashi Murakami, Yokohama, all of Japan

[73] Assignee: Nippon Kokan Kabushiki Kaisha, Tokyo, Japan

[22] Filed: Mar. 21, 1973

[21] Appl. No.: 343,218

[30] Foreign Application Priority Data
Mar. 31, 1972 Japan.................. 47-32495
Apr. 21, 1972 Japan.................. 47-39554
Apr. 21, 1972 Japan.................. 47-39555

[52] U.S. Cl. .................. 252/373; 75/34; 75/35; 75/41; 75/42; 252/188
[51] Int. Cl.² .................. C01B 2/28; C10K 3/06
[58] Field of Search ...... 252/188, 373; 48/213, 214; 423/246; 75/26, 34–35, 41–42, 91

[56] References Cited
UNITED STATES PATENTS

| | | |
|---|---|---|
| 2,577,730 | 12/1951 | Benedict et al.......................... 75/35 |
| 2,740,706 | 4/1956 | Paull et al............................... 75/35 |
| 3,126,276 | 3/1964 | Marshall et al......................... 75/35 |
| 3,189,438 | 6/1965 | Von Bogdandy....................... 75/35 |
| 3,193,378 | 7/1965 | Pest ....................................... 75/35 |
| 3,232,728 | 2/1966 | Reynolds ............................... 252/373 |
| 3,303,017 | 2/1967 | Mayer et al............................ 252/373 |
| 3,607,156 | 9/1971 | Schlinger et al....................... 252/373 |
| 3,770,421 | 11/1973 | Celada et al........................... 75/35 |

*Primary Examiner*—Benjamin R. Padgett
*Assistant Examiner*—Irwin Gluck
*Attorney, Agent, or Firm*—Flynn & Frishauf

[57] ABSTRACT

Liquid hydrocarbon containing substance such as crude oil, fuel oils and heavy oils or solid hydrocarbon containing substance such as coal and plastic scraps or discards is used as the source of hydrocarbon. Gas containing hydrocarbons produced by the heat decomposition of the source of hydrocarbon, or a gas mixture produced by admixing a gas produced by gasifying, atomizing or pulverizing the source of hydrocarbon with coke oven gas or a gas produced by heat decomposing the source of hydrocarbon by the action of steam containing oxygen, or by the action hydrogen, is admixed with furnace top gas discharged from the top of a reducing furnace and containing $CO_2$ and $H_2O$, and the resulting gas mixture is converted into the reducing gas consisting essentially of CO and $H_2$ while the gas mixture is maintained at a predetermined high temperature.

4 Claims, 3 Drawing Figures

METHOD OF MANUFACTURING HIGH QUALITY REDUCING GAS BY TWO STAGE REFORMING PROCESSES

BACKGROUND OF THE INVENTION

This invention relates to a method of manufacturing reducing gas and more particularly to a method of manufacturing high quality reducing gas from various sources of hydrocarbon materials.

Known methods of forming valuable gases by decomposing a raw material such as coal or heavy oil include hydrogenerator technique wherein the raw material is decomposed by using $H_2$ to produce town gas and a technique wherein plastic discards are decomposed by using $H_2$ to form fuel gases.

In our Japanese patent application No. 50570 or 1971 we have proposed a method of manufacturing high temperature reducing gases which comprises the steps of heating gaseous hydrocarbons containing one to four carbon atoms such as coke oven gas to a temperature in a range at which free carbon is not formed, and then reforming the heated gaseous hydrocarbons with top gas or the gas derived out from the top of a reducing furnace thereby forming high temperature reducing gas.

Gases obtained by heating hydrocarbon containing substances such as crude oils, fuel oils, heavy oils and plastic discards usually contain a large quantity of so-called heavy hydrocarbons such as cyclic hydrocarbons so that when such gases are heated to high temperatures, free carbon will be formed. Moreover, the resulting gas has a remarkable disadvantage that it is difficult to react with $CO_2$ and $H_2O$ components contained in the top gas. On the other hand, the hydrocarbon gas containing one to four carbon atoms readily undergoes reaction with $CO_2$ and $H_2O$ but its amount is limited where coke over gas, for example, is used as the raw material. Because the amount of coke over gas decreases as the coke ratio in a blast furnace is decreased. Further, high purity $H_2$ is utilized as the raw material as in the case of hydrogenation, the cost of the reducing gas is high. Moreover, the source of high purity $H_2$ is limited. For this reason, this method is limited to the production of town gas or raw material gas for chemical industries and can not be applied to the manufacture of reducing gas. Theoretically, where steam is used as the carrier gas as in the case of manufacturing town gas it is necessary to convert hydrocarbon into $H_2$ and CO. As this reaction is an endothermic reaction its heat loss is great. As the quantity of $H_2$ increases, the water gas reaction increases the $H_2O$ content of the reducing gas thereby impairing the property of the reducing gas.

It is also well known in the art to produce town gas by the steam cracking of a raw material such as naphtha, crude oil and heavy oil, and a number of industrial processes have already been proposed including Onia-Gegi process, Segas process and a process utilizing a decomposition furnace of Hall type, for example. Recently, many attempts have been tried to manufacture gas by steam decomposition of heavy oils. One example of this process is disclosed in the specification of British Pat. No. 1,243,896 to Kureha. This process was developed for the purpose of manufacturing carbon fiber and pitch. The hydrogenator process developed by U. K. Gas Council's Research Station relates to a method comprising the steps of decomposing heavy fuel oil by hydrogenation to form a rich gas, improving the quality thereof by desulfurization thus producing town gas. For the purpose of producing low calorie fuel gas Esso Flexicoker process has been developed in which use is made of a fluidized bed using heated medium and light oils and gas oils are recovered from heavy oils. Methods for manufacturing fuel oil by decomposing high molecular weight hydrocarbons such as plastic scraps with steam are now also being studied. According to the reports on the result of experiments, decomposed gas essentially consisting of $CH_4$, $H_2$, hydrocarbons containing from two to four carbon atoms and carbon was obtained. Other reducing processes such as HyL process according to which natural gas is treated with steam to obtain reducing gas which is used to reduce iron ores and other reducing processes such for example as purofer process and ARMCO process wherein top gas exhausted from a reducing furnace which uses reformed natural gas as a raw material is converted into reducing gas have also been proposed.

However, any method of manufacturing reducing gas suitable for use in reducing furnaces has not been developed wherein the raw material consisting of crude oil, heavy oils, fuel oils, coal or high molecular weight hydrocarbon substances such as plastic scraps is heat decomposed by heating or by using steam containing $O_2$ or hydrogen to perform a primary reforming treatment to form gas containing hydrocarbons which contain one to four carbon atoms, and the resulting gas is used as the intermediate gas and subjected to a secondary reforming treatment in which the gas is mixed under a high temperature condition with the top gas exhausted from the top of a reducing furnace, as in this invention.

Generally, from the standpoint of natural resources it is necessary to recover heavy oils and high molecular weight hydrocarbon substances such as plastic scraps, and the research for recovering these substances by heat decomposition was started only recently. However, many problems to be solved are left.

More particularly, where an excess quantity of steam is used, these substances decompose at high temperatures to form gas consisting essentially of carbon and hydrocarbons containing from one to four carbon atoms in addition to small quantities of CO and $H_2$. However, it is difficult to obtain reducing gas having a composition suitable for use in reducing furnaces, that is a composition consisting of $CO_2 + H_2O \leqslant 7\%$ by volume and CmHn $\leqslant 5\%$ by volume, by further decomposing the resulting gas at high temperatures. By such one step process of reforming, it is inevitable that the resulting reducing gas also contains free carbon (soot) metals, sulfur, chlorine, etc., which cause adverse effects on the reducing step carried out in the reducing furnace. Further, as it is essential to use an excess quantity of steam, the $H_2O$ content in the reducing gas is high.

According to the Kureha process referred to above, a heat medium substance heated to a temperature of 1300°C to 2500°C and a reaction temperature of from 900°C to 1500°C are used. Further, in order to form reducing gas by decomposing the resulting free carbon and hydrocarbons containing from one to four carbon atoms with steam, it is necessary to use a high temperature of at least higher than 1000°C. This limits the material for fabricating the reactor. When high molecular weight hydrocarbon substances such as plastic scraps or ordinary oil are decomposed by contacting them with steam at a temperature lower than 900°C, a large quantity of hydrocarbons containing one to four carbon atoms will remain undecomposed so that such gas is not suitable for use as reducing gas unless it is treated further. On the other hand, if these substances are decomposed with steam at high temperatures, as the resulting gas contains an excess quantity of steam as above described, this gas is also not suitable to be used as reducing gas.

As above described, the gas formed by the thermal cracking of heavy oils or high molecular weight hydrocarbon substances such as plastic scraps greatly decreases the reaction velocity in the reducing furnace thereby consuming coke according to an equation.

$$H_2O + C \text{ (coke)} \rightarrow H_2 + CO \qquad 1$$

or increases the quantity of $H_2O$ according to the water gas reaction expressed by $$H_2O + CO \leftrightarrows H_2 + CO_1 \qquad 2$$

Of course these reactions affect reducing reaction. In addition, hydrocarbons containing one to four carbon atoms form free carbon according to the following equation 3, thereby affecting the reducing reaction.

$$CmHm \rightarrow mc\downarrow + (n/2) H_2 \qquad 3$$

For these reasons, the gas formed by such thermal cracking can not be supplied directly to a reducing furnace. Unless otherwise treated, nonvolatile components and inpurities such as sulfur which are contained in the gas also affect the reducing reaction.

As above described, all of the prior art processes are not directed to the manufacture of reducing gas for use in the reducing furnaces but instead to the manufacture of town gas. For town gas, hydrocarbons containing one to four carbons are suitable for use as fuel gas because they increase heat quantity. Such gas, however, is not suitable for use as reducing gas for the reasons pointed out hereinabove. Prior art method of reforming or inproving the quality of top gas as HyL process, Purofer process and ARMCO process also utilize almost pure $CH_4$ for a reforming agent and do not use an intermediate gas consisting of hydrocarbons containing one to four hydrocarbons or their mixtures as the reforming agent. For the reason described above, it is impossible to manufacture reducing gas with these processes by utilizing crude oils, heavy oils, fuel oils, coal or high molecular weight hydrocarbon substances such as plastic scraps. Moreover, when the reducing gas is prepared by well known catalytic reforming process such as Kollogg ICI process it is not only necessary to use an expensive catalyst but also to use only natural gases of low sulfur content or desulfurized naphtha as the modifying agent. Further, as it is necessary to use a tube heater it is impossible to maintain the temperature which is necessary for the reducing process. In any of the nuclear power iron making processes proposed heretobefore, the one step reforming process is used. Thus, although reheating of gas has been considered two step reforming process has not been adopted.

It has also been proposed to prepare fuel gas or recovered heavy oil by the thermal cracking of high molecular weight hydrocarbons such as plastic scraps or discards and the result of basic experiment on the method of preparing gas containing low molecular weight hydrocarbons which contain one to four carbon atoms and free carbon by heat decomposing plastics with steam has also been reported in the art. Examples of the method of the decomposition treatment of plastic discards are rotary decomposition process, polybath process, fluidizing process, moving bed process and rotary furnace process. Reports have also been made in which polyethylene, polypropylene, actactic polypropylene, polystyrene, etc., are decomposed, and the quantities of oil and gas formed by the decomposition are shown and wherein these materials are heat decomposed by rotary kiln process, fluidized bed process, molten bath process, etc., to form recovered oil or gas which contains low molecular weight hydrocarbons containing one to four carbons. Each of these prior proposals relates to the manufacturing of recovered oil and fuel gas by the decomposition of high molecular weight hydrocarbon substances such as plastic scraps and does not give any hint for the manufacture of reducing gas

SUMMARY OF THE INVENTION

It is an object of this invention to provide a novel method of preparing reducing gas free from excess water, non-volatile components and impurities which are formed by the heat decomposition of the raw material hydrocarbons.

A further object of this invention is to produce reducing gas essentially consisting of CO and $H_2$ and containing only a small quantity of $CO_2$, $H_2O$ and CmHn.

Still further object of this invention is to provide a novel method of manufacturing high quality reducing gas in which the modification of quality improving process is performed in two stages whereby the temperature of the primary modification process can be decreased.

Another object of this invention is to provide a novel method of manufacturing high quality reducing gas without using any expensive catalyst.

Another object of this invention is to provide a novel method of manufacturing high quality reducing gas capable of using ordinary liquid hydrocarbon containing substances such as crude oil, fuel oils, heavy oils as well as solid hydrocarbon containing substances such as coal, plastic scraps of discards.

Further object of this invention is to provide an improved method of manufacturing reducing gas by utilizing the heat of top gas exhausted from the top of reducing furnaces of nuclear energy.

Another object of this invention is to provide an improved method of manufacturing high quality reducing gas wherein the quality of the gas is improved by two stage reforming steps and the apparatus for performing the primary and secondary reforming steps can be installed remotely.

According to this invention these and other objects can be accomplished by providing a method of manufacturing reducing gas from hydrocarbons, characterized in that a source of hydrocarbon in the form of liquid hydrocarbon containing substance such as crude oil, fuel oils and heavy oils or of solid hydrocarbon containing substances such as coal and plastic scraps or discards is heat decomposed by heating or by the action of steam containing oxygen, or by the action of hydrogen to produce an intermediate gas, that the intermediate gas is heated to a temperature of from 150°C to 1100°C, that the heated intermediate gas is admixed with gas heated to a temperature above 1100°C and containing $CO_2$ and $H_2O$ and that the resulting gas mixture is maintained at a temperature above 1100°C whereby the quality of the gas mixture is improved by two steps.

According to this invention there is also provided a method of manufacturing reducing gas by utilizing nuclear heat energy from a hydrocarbon source comprising crude oil, fuel oils, heavy oils, coal or plastic scraps or discards, characterized in that a primary reformed intermediate gas in formed by utilizing nuclear heat and by installing a primary reforming furnace remote from a nuclear reactor, that a secondary reforming furnace is installed near a reducing furnace and that a portion of the top gas exhausted from the top of said reducing furnace, or a portion of the primarily modified gas or a mixture thereof is utilized to heat said primarily reformed intermediate gas and said secondary reforming furnace.

Thus according to one aspect of this invention a hydrocarbon source comprising normally liquid hydrocarbon containing substances such as crude oil, fuel oils and heavy oils or solid hydrocarbon containing substance such as coal and plastic discards is blown into coke oven gas which has been preheated to a predetermined high temperature so that free carbon will not be formed in the succeeding process steps after gasifying the hydrocarbon source by heating the same to a temperature not to form free carbon, or the hydrocarbon in the form of mist or powder is blown into the heated coke oven gas, the resulting gas mixture is maintained at a temperature in a range of from 150°C to 1000°C at which the gas mixture does not form any free carbon or liquefy, and then the high temperature gas mixture is rapidly mixed with high temperature furnace top exhaust gas which is exhausted from the top of a reducing furnace such as a blast furnace and containing $CO_2$ and $H_2O$ in a converting or reforming furnace maintained at a temperature higher than 1100°C thereby reforming the gas mixture. The amount of the gas containing $CO_2$ and $H_2O$ is selected to be slightly in excess of the stoichiometric amount required for converting all hydrocarbons contained in the gas mixture into CO and $H_2$ whereby a high quality reducing gas containing essentially CO and $H_2$ is produced.

More particularly, liquid hydrocarbon containing substances such as crude oil, fuel oil, heavy oil or the like or solid hydrocarbon containing substances such as plastic discards (so-called heavy hydrocarbons containing five or more carbon atoms, for example cyclic hydrocarbons) are blown into coke oven gas which has been preheated to a temperature below 1100°C so that free carbon will not be formed after converting the raw material hydrocarbons into the form of mist, powder or gas. In the case of liquid hydrocarbon containing substances, it is possible to mechanically atomize them. Although plastic discards can be blown into the coke oven gas in the form of a fine powder, it is advantageous to blow them after gasifying the discards. In the latter case, the gasified hydrocarbon may be admixed with the coke oven gas in the presence of a suitable catalyst. When the coke oven gas is used as a carrier gas and when the gasified product of the liquid hydrocarbon containing substance is admixed with the coke oven gas under a controlled temperature condition it is possible to produce so-called light hydrocarbons by hydrogenation.

The resulting gas mixture containing hydrocarbons is maintained at a temperature between 150°C and 1000°C at which the gas mixture will not form free carbon and furnace top exhaust gas exhausted from the top of a reducing furnace and containing $CO_2$ and $H_2O$ is heated and then admixed with the gas mixture, the amount of the top gas being sufficient to supply 100 to 120% of $CO_2$ and $H_2O$ which are stoichiometrically required for causing the reactions of following equations 4 and 5.

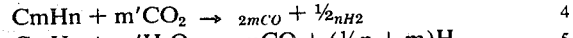

$$C_mH_n + m'CO_2 \rightarrow 2mCO + \tfrac{1}{2}nH_2 \qquad 4$$
$$C_mH_n + m'H_2O \rightarrow mCO + (\tfrac{1}{2}n + m)H_2 \qquad 5$$

However, since the gas mixture contains $H_2O$ and $CO_2$ it is necessary to bring the quantities of $H_2O$ and $CO_2$ into the range described above by decreasing the quantity of $CO_2$ contained in the top gas. Stoichiometrically, as the quantities of $CO_2$ and $H_2O$ are determined according to equations 4 and 5, $m = m'$. Actually, however, we have found that a condition of $m' \geq m$ can improve the characteristic of the formed reducing gas.

BRIEF DESCRIPTION OF THE DRAWINGS

The invention can be more fully understood from the following detailed description taken in conjunction with the accompanying drawings in which.

DESCRIPTION OF THE PREFERRED EMBODIMENTS

Figure 1:
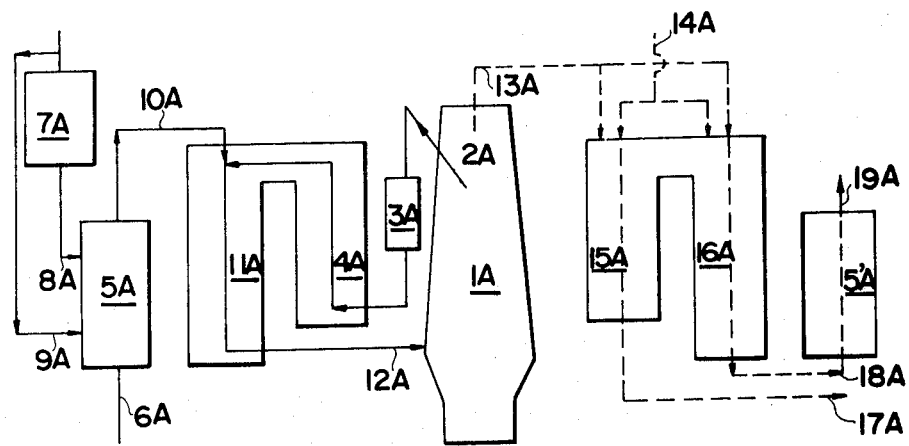
FIG. 1 shows a block diagram of apparatus employed to carry out the method of this invention.

Referring now to FIG. 1 of the accompanying drawings furnace top exhaust gas 2A derived out from the top of a reducing furnace 1A such as a blast furnace or a shaft furnace is passed through a water and dust removing device 3A for removing the water and dust contained in the top exhaust gas. The gas cleaned by the water and dust removing device 3A is then heated in a furnace 4A. A heating furnace 5A is used to heat coke oven gas 6A generated by a coke oven, not shown, to a temperature below 1100°C. A heat decomposition furnace 7A is provided for gasifying a hydrocarbon source such as liquid hydrocarbon containing substances such as crude oil, fuel oil, heavy oil or the like or solid hydrocarbon containing substances such as plastic discards or the like and for preheating the gasified hydrocarbon to a temperature below 650°C at which free carbon will not be formed to form a gaseous hydrocarbon 8A. The liquid or solid hydrocarbon source is atomized to form a finely pulverized hydrocarbon 9A. The hydrocarbon source may take any one of these forms or combinations thereof. The gaseous or pulverized hydrocarbons 8A and 9A are blown into coke oven gas 6A in the heating furnace 5A. The gas mixture 10A formed by admixing the coke oven gas and the gasified, atomized or pulverlized hydrocarbon is maintained at a temperature of from 150°C to 1000°C at which any appreciable quantity of free carbon will not be formed and then rapidly admixed in a reforming furnace 11A with the high temperature furnace top waste gas supplied from the heating furnace 4A and containing $CO_2$ and $H_2O$. The temperature in the reforming furnace 11A is maintained at a temperature above 1100°C for reforming the gas mixture into reducing gas 12A consisting essentially of CO and $H_2$ and suitable for use in reducing furnaces such as blast furnaces and shaft furnaces.

The furnace top exhaust gas 13A discharged from the top of the reducing furnace 1A is used as the fuel for heating another set of heating furnace 15A, and reforming furnace 16A which are identical to those described above. The air 14A necessary for the combustion of the furnace top exhaust gas is supplied to this set. As the combustion gas exhausted from heating furnace is at a low temperature so that it can be discharged directly into the atmosphere. However, as the gas exhausted from reforming furnace 16A has a temperature above 1000°C, its heat is recovered by heating a code oven gas heating furnace 5'A or the heat decomposition furnace 7A. 19A shows the exhaust gas from the coke oven gas heating furnace 5'A. As above described, the method of this invention can be worked out at a high efficiency by the alternate use of a plurality of sets.

Typical examples are shown in the following table 1.

Table 1

| hydrocarbon source | kerosene | heavy oil | heavy oil | plastic discards |
|---|---|---|---|---|
| quantity of coke oven gas Nm³/hr | 100 | 103 | 128 | 98 |
| temperature of the coke oven gas °C | 850 | 850 | 900 | 850 |
| quantity of hydrocarbon admitted kg/hr | 4.5 | 5.1 | 2.7 | 6.5 |
| temp. of hydrocarbon | 550 | 570 | room temp. | 630 |
| temperature of mixed gas °C. | 692 | 703 | 710 | 764 |
| BFG quantity Nm³/hr | 238 | 251 | 272 | 249 |
| BFG temp. °C | 1185 | 1265 | 1320 | 1225 |
| quantity of reducing gas Nm³/hr | 402 | 422 | 488 | 415 |
| temp. of reducing gas °C | 1220 | 1235 | 1203 | 1218 |
| composition of reducing gas | | | | |
| $CO_2$ % by volume | 3.5 | 4.2 | 4.8 | 3.1 |
| CO % by volume | 30.3 | 31.0 | 31.0 | 32.6 |
| $H_2$ % by volume | 34.0 | 32.5 | 33.4 | 31.9 |
| $N_2$ % by volume | 32.2 | 32.3 | 30.8 | 32.4 |

The novel method of preparing reducing gas has the following advantages:

1. Although the quantity of the available coke oven gas is limited, it is possible to alleviate this limitation by enriching the coke oven gas by the hydrocarbon sources.
2. By utilizing the coke oven gas as a carrier gas after admixing the coke oven gas and the gasified liquid hydrocarbon source or plastic discards under a controlled temperature condition it is possible to convert $CO_2$ and $H_2O$ contained in the furnace top gas by an endothermic reaction thereby efficiently producing reducing gas without increasing the quantity of $H_2O$ as in the case of using steam.
3. Partial hydrogenation of cyclic hydrocarbons is also possible by the suitable selection of the condition of reaction and a catalyst.
4. By blowing atomized liquid hydrocarbon source or gasified plastic discards into the heated coke oven gas it is possible to control the temperature of the gas mixture and the total content of the hydrocarbons by utilizing the sensible heat of the coke oven gas.

According to another aspect of this invention, there is provided a method of manufacturing reducing gas by two reforming steps, which comprises the step of performing a first reforming on by the heat decomposition of crude oil, heavy oils, fuel oils, coal or high molecular weight hydrocarbons such as plastic discards in the presence of a larger quantity of steam (containing $O_2$) or hydrogen than the stoichiometric quantity with regard to the carbon content of the hydrocarbons, cooling the resulting gas for removing excess water, nonvolatile components and impurities such as sulfur thereby producing an intermediate gas consisting essentially of hydrocarbons containing one to four carbon atoms and containing more than 5% of hydrocarbons in which the atomic ratio of C/H is larger than 0.25 and wherein the content of total CmHn is lower than 98% by volume, admixing the intermediate gas and the furnace top gas which is exhausted from the top of a reducing furnace and containing $CO_2$ and $H_2O$ at a pressure of about the saturation steam pressure and wherein the ratio of $CO_2$ to carbon content is 1.0 to 1.1 based on the stoichiometry, after the intermediate gas and the furnace top exhaust gas have been heated respectively to predetermined temperatures, and improving the quality of the gas mixture by maintaining the same at a predetermined temperature thereby obtaining reducing gas for use in reducing furnaces such as blast furnaces, the reducing gas essentially consisting of CO and $H_2$ and wherein $CO_2 + H_2O \leq 7\%$ by volume, CmHm $\leq 5\%$ by volume, and the content of free carbon is less than 1% by weight.

The principle of the chemical reaction of this process lies in that the primary reforming step is performed by the heat decomposition of the hydrocarbons by using a larger quantity of $H_2O$ (containing $O_2$) or $H_2$ than the stoichiometric quantity with respect to the carbon content of the hydrocarbons. Dependent upon the type of the raw material there occurs some difference in the composition of the decomposed product, non-volatile components and impurities, but it is possible to obtain an intermdiate gas consisting of hydrocarbons containing one to four carbon atoms, said hydrocarbons containing more than 5% by volume of hydrocarbons in which the atomic ratio of C/H is higher than 0.25, and less than 89% by volume of CmHn.

Then, under high temperature conditions, the intermediate gas is admixed with furnace top gas containing $Co_2$ and $H_2O$ at about the saturated steam pressure and wherein the ratio of $CO_2$ to carbon is within a range of 1.0 to 1.1 based on the stoichiometry thereby performing the secondary improvement of the quality. Thus, the chemical reaction of the secondary modifying treatment is believed to proceed according to the following equation.

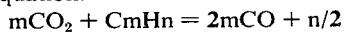

$$mCO_2 + CmHn = 2mCO + n/2 \qquad 6$$

The reason that the heating temperature of the intermediate gas was limited to a temperature below 1100°C is that if the temperature is increased beyond this limit, the decomposition would proceed excessively before the succeeding reation is performed, and the reason that the heating temperature of the top gas and the temperature at which the gas is maintained at the time of the secondary reforming are selected to be above 1100°C is that with a temperature lower than 1100°C, it takes a longer time for the secondary reforming or quality improvement thus lowering its efficiency and that it is necessary to maintain the resulting reducing gas at a high temperature when it is admitted into the reducing furnace.

Figure 2:
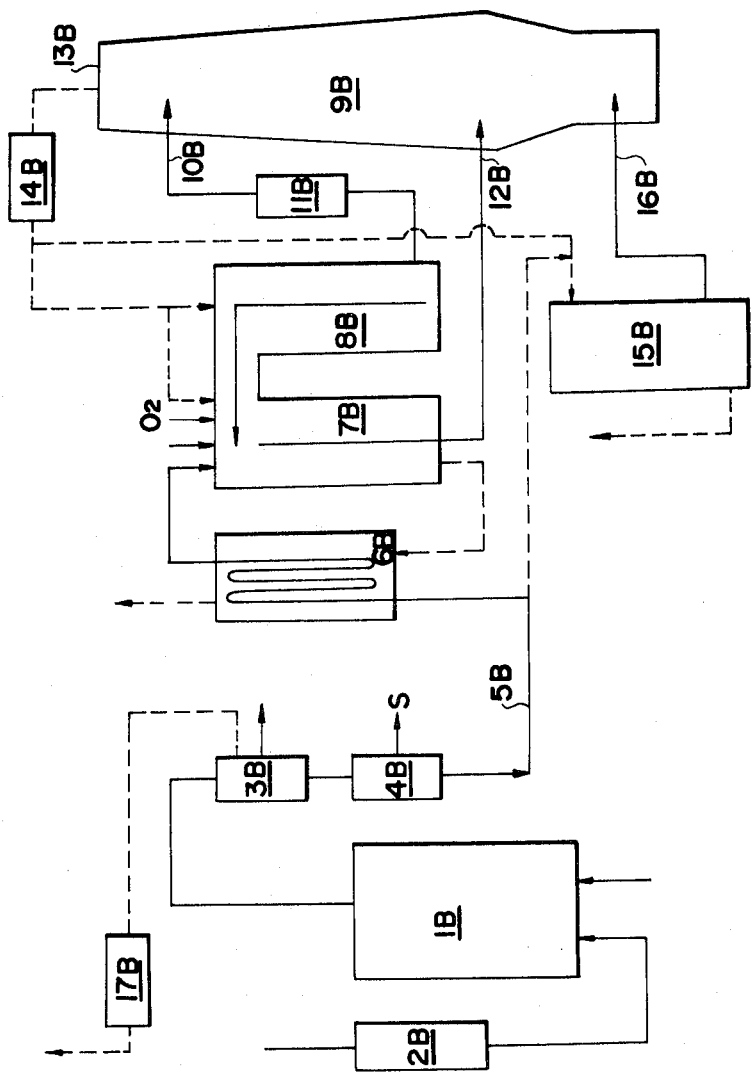
FIG. 2 shows a block diagram of reformed apparatus in which reforming or quality improvement of the gas is performed in two stages.

FIG. 2 shows a block diagram of the apparatus for carrying out the modified method. Liquid hydrocarbons such as crude oil, heavy oil, fuel oil or solid high molecular weight hydrocarbon substances such as coal or plastic scraps are reformed by heat decomposition in the presence of steam (containing $O_2$) or hydrogen in a primary reforming furnace 1B. Steam or hydrogen supplied to the primary reforming furnace 1B is generated in a steam or hydrogen generator 2B which may be a heat exchanger when the neclear heat energy is used or a heting furnace which generates steam by using exhaust gas or a portion of the gas produced. The coarse gas produced in the primary reforming furnace 1B by the heat decomposition of the high molecular weight hydrocarbons occurring at a temperature of from about 700°C to 1,000°C is introduced into a cooler 3B for removing excess water, non-volatile components and other impurities. The coarse gas cooled by the cooler 3B is then introduced into a desulfurizing device 4B. Where polyethylene, polypropylene, etc. are used as the raw material plastic scrap, the desulfurizing device 4B is not necessary. The process steps up to this stage are necessary for the primary reforming or quality improvement by which the raw material high molecular hydrocarbons are heat decomposed by steam (containing $O_2$) or hydrogen to form the coarse gas. In this case, it is essential to use $H_2O$ or $H_2$ in excess of the stoichiometric quantity with respect to the carbon content. Excess water, non-volatile components and impurities such as sulfur are removed from the coarse gas to obtain an intermediate gas. However, the coarse gas may contain a maximum of about $5g/Nm^3$ of sulfur. The intermediate gas contains hydrocarbons containing one to four carbon atoms, as well as hydrocarbons in which the atomic ratio of C/H is higher than 0.25 and less than 89% by volume of the total CmHn. The intermediate gas is conveyed through a conduit 5B to a secondary reforming apparatus to be described hereunder and which sometimes is located from the primary reforming apparatus described above. The intermediate gas is preheated to a temperature less than 1100°C in a preheater 6B and then admitted into a secondary reforming furnace 7B. The top gas exhausted from the top of a blast furnace 9B is passed through a dust and moisutre removing apparatus 11B and thence introduced into the secondary reforming furnace 7B to be mixed with the intermediate gas after the purified gas has been preheated to a temperature above 1100°C by a preheating furnace 8B thereby effecting the secondary reforming. By maintaining the temperature of the gas mixture above 1100°C, the reforming treatment proceeds perfectly. It is advantageous to use such top gas that contains $CO_2$ and $H_2O$ at about the saturated steam pressure and wherein the ratio of $CO_2$ to carbon is from 1.0 to 1.1 on the basis of stoichiometry. The resulting reducing gas is blown into the blast furnace through the lower inlet port 12B for the purpose of reducing ion ore.

As shown by dotted lines in FIG. 2, the top exhaust gas derived out from the top 13B of the blast furnace may be used as the fuel for the secondary reforming furnace 7B and preheating furnace 8B after the top gas has been passed through a dust and moisture removing device 14B. Fuel oil and naphtha can also be supplied to the secondary reforming furnace together with $O_2$ to supply a heat quantity necessary for the secondary quality improvement. A hot air furnace 15B commonly installed for a blast furnace is provided which is heated by the top gas exhausted from the furnace top 13B.

Where calorie is not sufficient, the top gas may be enriched by using a portion of the intermediate gas. The hot air from the hot air furnace 15B is blown into the blast furnace 9B through a tuyere 16B. A waste heat boiler or heat exhanger 17B is provided to preheat the raw material.

The reducing gas produced by the two stage reforming or quality improving process consists essentially of CO and $H_2$, $CO_2 + H_2O \leq 7\%$ by volume, CmHn $\leq 5\%$ by volume and less than 1% by weight of free carbon and has an excellent quality. The reducing gas may be used in all steel making processes utilizing blast furnaces, shaft furnaces, fluidized beds or stationary beds. The reducing gas can also be used for the reduction of non-ferrous metals and nuclear power steel making process.

The following table 2 shows examples of this embodiment.

Table 2.

| raw material | polyethylen | polypropylene |
| --- | --- | --- |
| raw material kg/hr | 12.1 | 13.1 |
| decomposition temperature °C | 635 | 723 |
| decomposition pressure kg/cm² | 2.1 | 2.0 |
| BFG Nm³/hr | 88.8 | 89.3 |
| conversion temperature °C | 1235 | 1212 |
| conversion pressure kg/cm² | 1.1 | 1.0 |
| quantity of the gas formed Nm³/hr | 102.3 | 104.8 |
| composition of the gas formed | | |
| CO₂ % by volume | 4.1 | 3.5 |
| CO % by volume | 38.0 | 37.2 |
| H₂ % by volume | 19.8 | 17.3 |
| N₂ % by volume | 38.3 | 42.0 |

The advantageous merits of this invention can be enumerated as follows:

1. The two stage reforming process is effective to remove excess water, non-volatile components, impurities such as sulfur, C, Cl and metals formed by the heat decomposition of the raw materials hydrocarbons from the resulting gas.

2. Since the primary reforming is effected by using steam (containing $O_2$) or hydrogen and the secondary reforming is effected by using $CO_2$, it is possible to produce high quality reducing gas containing $CO_2 + H_2O \leq 7\%$ by volume and CmHm $\leq 5\%$ by volume, for example. Especially, it is possible to reduce the percentage of $H_2O$ which is injurious to the reducing process.

3. In the known one step reforming process, although it is not possible to decrease the content of hydrocarbons containing from one to four carbon atoms unless an excess quantity of steam is used and the temperature is increased above 1200°C, according to the two stage reforming process of this invention, the primary reforming process constitutes a preliminary processing step and may be effected at a relatively low temperature of 700°C to 1000°C. The hydrocarbons containing one to four carbons remaining in the gas after the primary reforming step can be removed by the reaction of equation 6 during the reforming step.

4. In the novel two stage reforming process it is not necessary to use an expensive catalyst such as nickel which is liable to be corroded by sulfur or free carbon.

5. The fact that the temperature of the primary reforming process of this invention may be relatively low is advantageous for the construction and material for steam and hydrogen generators, the fuel used as well as the heat exchangers. In other words, it is possible to use existing nuclear reactors, heat exchangers and steam generators thereby recovering waste heat.

According to another aspect of this invention there is provided a novel method of manufacturing reducing gas consisting essentially of CO and $H_2$, which method comprising the steps of heat decomposing high molecular weight hydrocarbon substances, such as plastic scraps thus forming gas containing hydrocarbon gas and the vapour of hydrocarbon oil, converting the resulting gas at a high temperature with $CO_2$ and $H_2O$ contained in the furnace top exhaust gas obtained from the top of a reducing furnace. According to this reforming, hydrocarbon containing gas which is produced by the heat decomposition of high molecular weight hydrocarbon substances such as plastic scraps is rapidly admixed with high temperature furnace top gas exhausted from the top of a reducing furnace and containing $CO_2$ and $h_2O$ at such a ratio that the sum of $CO_2$ and $H_2O$ contained in the two gases is in a range of 1.0 to 1.2 time of the stoichiometric equivalent necessary for decomposing all hydrocarbons contained in the gas produced by the heat decomposition while the temperature of the mixture is maintained at a temperature above 1100°C whereby reducing gas consisting essentially of CO and $H_2$ is produced. When heated to a temperature of 400°C to 500°C, nearly all parts of the high molecular weight hydrocarbon substances undergo heat decomposition to form gas.

After heating to a high temperature the furnace top gas containing $CO_2$ and $H_2O$, the top gas and said hydrocarbon containing gas are admixed quickly. The temperature of the resulting gas mixture is maintained above 1100°C. Where a catalyst is used, it is possible to reduce the temperature by about 100°C so that the gas mixture is maintained at about 1000°C. To this end, it is necessary to effect the conversion reaction by heating the gas discharged from the reducing furnace to a desired high temperature, or by heating the mixed gas in a heat storage chamber.

Where the plastic scraps or discards utilized in this modified method contain elements that greatly impair the heating furnaces or conduits such as chlorine and fluorine, the plastic scraps or discards are pretreated to remove these elements. For this reason, it is possible to use polyethylene, polypropylene, polybuthylene, attactic polypropylene, polystylene, urea resin, polyvinyl chloride or the like.

Figure 3:
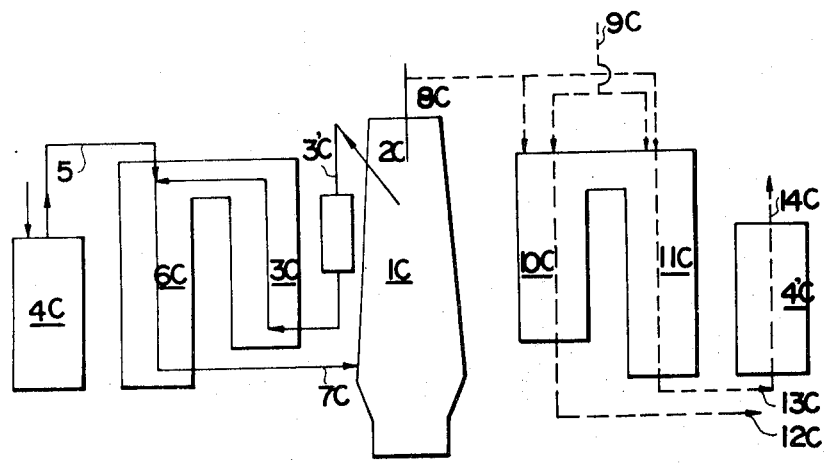
FIG. 3 shows a block diagram of the apparatus for carrying out a reforming of this invention.

FIG. 3 shows a block diagram of an apparatus suitable for carrying out this modified embodiment. The furnace top exhaust gas discharged from a reducing furnace 1C such as a blast furnace or a shaft furnace is removed of dust and water by means of dust and water removing device 3'C and is then heated in a heating chamber 3C. The high molecular weight hydrocarbons such as plastic scraps are decomposed in a decomposition furnace, such decomposition reaction being effected by adding steam or hydrogen, if necessary. The resulting hydrocarbon containing decomposition gas 5C is conveyed to a converting chamber 6C through a conduit provided with a lining suitable for the transfer of the high temperature gas. The hydrocarbon containing gas is rapidly admixed in the converting chamber 6C with the furnace top gas containing $CO_2$ and $H_2O$ and has been preheated in the heating chamber 3C. To efficiently reform the gas mixture, it is necessary to maintain the same at a temperature at least a temperature above 1000°C. Although a suitable catalyst may be used in the reforming chamber 6C, the desired reforming can also be effected by increasing the temperature and without using the catalyst. The reducing gas formed in the reforming chamber 6C by a chemical reaction is blown into the reducing furnace such as a blast furnace through a tuyere 7C.

To the right of the blast furnace 1C is shown a heating system comprising a decomposition furnace 4'C, a heating furnace 10C and a reforming furnace 11C which are heated by furnace top exhaust gas 8C discharged from the top of the blast furnace 1C. The top gas is burned by adding air 9C there to generate heat. If desired, a fuel burner, not shown may be used so as to supply the desired heat quantity during reduction combustion during gas making, whereas by oxidation combustion during heating. The exhaust gas 12C from the heating furnace 10C usually has a temperature of less than 300°C. As the exhaust gas 13C from the reforming furnace 11C has a temperature of more than 1000°C, it can be used to heat the decomposition furnace 4'C to recover the heat of the exhaust gas.

The following table 3 shows examples of this embodiment.

Table 3

| raw material | polystyrene | polyvinyl chloride |
|---|---|---|
| raw material kg/hr | 11.7 | 10.2 |
| decomposition temp.-rature °C | 711 | 562 |
| decomposition pressure kg/cm² | 1.7 | 2.0 |
| BFG Nm³/hr | 105.2 | 87.5 |
| conversion temp. °C | 1245 | 1220 |
| conversion pressure kg/cm² | 1.1 | 1.0 |
| quantity of the gas formed Nm³/hr | 118 | 98.8 |
| composition of the gas formed | | |
| $CO_2$ % by volume | 5.1 | 3.8 |
| CO % by volume | 37.8 | 39.8 |
| $H_2$ % by volume | 18.2 | 12.2 |
| $N_2$ % by volume | 39.9 | 43.3 |

This modified embodiment has the following advantages.

1. It is possible to use efficiently the high molecular weight hydrocarbon substances such as plastic scraps or discards which form the source of public hazard as the source of hydrocarbon for manufacturing reducing gas.

2. As these substances are finally decomposed into CO and $H_2$ (although formation of a small quantity of $CO_2$ and $H_2O$ is inevitable), this process is much more efficient than the process according to which the plastics are recovered after converting them into monomers.

3. It is possible to use any one of many types of plastics as the source of hydrocarbon so that the limitation on the raw material is not serious.

4. As shown in FIG. 2 it is possible to use such typical plastics as polyethylene, polypropylene, polystylene and polyvinyl chloride as the source of the raw material hydrocarbon for converting them into high quality reducing gas containing CO and H₂ at high percentages.

While in the foregoing three examples of the novel method of manufacturing reducing gas wherein the intermediate gas is produced from a source starting material consisting of crude oil, fuel oils, heavy oils or plastic scraps or discards by using coke oven gas, the decomposition by steam or the decomposition by heating, the advantages common to those examples are as follows.

1. It is possible to use ordinarily liquid hydrocarbon containing substances such as crude oil, fuel oils and heavy oils and solid hydrocarbn containing substances such as plastic scraps or discards as the source of hydrocarbon for preparing the reducing gas.

2. Although the secondary reforming or quality improving process of this invention requires to increase the reaction temperature, the heat for this purpose can be supplied from the top gas discharged from the top of a reducing furnace. If necessary, this can be readily accomplished by enriching the intermediate gas produced by the primary reforming process. Where nuclear energy is used for heating it is not necessary to use the top gas. The method of this invention greatly improves the thermal efficiency of the entire system.

3. According to the two step reforming process of this invention the primary reforming furnace and the reducing furnace may be installed remotely. This is especially advantageous in the case of a nuclear power iron making plant. Thus, it is possible to remotely install the reducing furnace and the nuclear reactor which involves a number of problems regarding safeness. Where the primary reforming process alone is combined with a nuclear reactor it is not necessary to reduce the temperature of the steam generated by the nuclear reactor thereby improving the overall heat efficiency of the system.

4. It is possible to efficiently use heavy oils including residue oil, waste oils and asphalt or plastic scraps or discards as the source of the hydrocarbon for producing the reducing gas.

What is claimed is:

1. In a method of manufacturing reducing gas from hydrocarbons, the improvement which comprises the steps of thermally decomposing a hydrocarbon source selected from the group consisting of crude oil, a fuel oil, a heavy oil, coal and plastics in the presence of steam containing oxygen or in the presence of hydrogen thereby forming an intermediate gas, heating the intermediate gas to a temperature of from 150°C. to 1100°C., admixing the heated intermediate gas with gas heated to a temperature above 1100°C. and containing CO₂ and H₂O, and maintaining the resulting gas mixture at a temperature above 1100°C. thereby improving the quality of the gas mixture.

2. The method according to claim 1 wherein said intermediate gas is formed by admixing a gasified, atomized or pulverized hydrocarbon source with a coke oven gas preheated to a temperature below 1100°C. after said hydrocarbon source has been heated to a temperature at which free carbon is not formed.

3. The method according to claim 1 wherein said intermediate gas is formed by thermally decomposing said hydrocarbon source by using an excess quantity of steam containing oxygen, or by using hydrogen and then cooling the decomposition gas to remove excess water, non-volatile components and impurities including sulfur.

4. The method according to claim 1 wherein said hydrocarbon source comprises high molecular weight hydrocarbon substances including plastic scraps or discards and the hydrocarbon source is thermally decomposed to obtain an intermediate gas containing hydrocarbons formed by the thermal decomposition.

* * * * *

UNITED STATES PATENT AND TRADEMARK OFFICE
CERTIFICATE OF CORRECTION

PATENT NO. : 3,909,446
DATED : September 30, 1975
INVENTOR(S) : TSUNEO MIYASHITA et al It is certified that error appears in the above-identified patent and that said Letters Patent are hereby corrected as shown below:

1) First page, first column, at "[75]": replace "Isuneo" with -- Tsuneo --.

2) Column 1, line 16: after "50570", replace "or" with -- of --.

3) Column 1, line 37: after "coke", replace "over" with -- oven --.

4) Column 1, line 38: after "coke", replace "over" with -- oven --.

5) Column 4, line 45: before "nuclear", replace "of" with -- or --.

6) Column 7, line 12: replace "code" with -- coke --.

7) Column 9, line 8: replace "neclear" with -- nuclear --.

8) Column 9, line 43: replace "moisutre" with -- moisture --.

9) Column 10, line 43: replace "materials" with -- material --.

10) Column 11, line 23: replace "h$_2$O" with -- H$_2$O --.

11) Column 13, line 13: replace "hydrocarbn" with -- hydrocarbon --.

Signed and Sealed this sixth Day of April 1976

[SEAL]

Attest:

RUTH C. MASON
*Attesting Officer*

C. MARSHALL DANN
*Commissioner of Patents and Trademarks*